US006046624A

United States Patent [19]

Nam et al.

[11] Patent Number: 6,046,624

[45] Date of Patent: Apr. 4, 2000

[54] INTERNAL POWER SUPPLY GENERATING CIRCUIT FOR A SEMICONDUCTOR MEMORY DEVICE

[75] Inventors: Ga-pyo Nam, Taebaek; Yong-sik Seok, Suwon; Hi-choon Lee, Seongnam, all of Rep. of Korea

[73] Assignee: Samsung Electronics, Co., Ltd., Suwon, Rep. of Korea

[21] Appl. No.: 08/988,285

[22] Filed: Dec. 10, 1997

[30] Foreign Application Priority Data

Dec. 10, 1996 [KR] Rep. of Korea ...................... 96-64014

[51] Int. Cl.[7] ........................................................ H02J 3/38

[52] U.S. Cl. .......................... 327/530; 327/538; 327/541; 327/545; 327/108

[58] Field of Search ..................................... 327/263, 264, 327/285, 288, 530, 535, 537, 538, 541, 544, 545, 546, 108

[56] References Cited

U.S. PATENT DOCUMENTS

| | | | |
|---|---|---|---|
| 4,209,713 | 6/1980 | Satou et al. | 327/310 |
| 4,742,250 | 5/1988 | Tobita | 327/535 |
| 4,749,882 | 6/1988 | Morgan | 327/170 |
| 4,859,870 | 8/1989 | Wong et al. | 327/108 |
| 5,126,588 | 6/1992 | Reichmeyer et al. | 327/108 |
| 5,164,621 | 11/1992 | Miyamoto | 327/262 |
| 5,260,646 | 11/1993 | Ong | 323/349 |
| 5,369,310 | 11/1994 | Badyal et al. | 327/143 |
| 5,561,385 | 10/1996 | Choi | 327/536 |
| 5,614,859 | 3/1997 | Ong | 327/333 |
| 5,689,460 | 11/1997 | Ooishi | 365/189.07 |
| 5,694,076 | 12/1997 | Ishibashi | 327/541 |
| 5,825,234 | 10/1998 | Sung et al. | 327/378 |

*Primary Examiner*—Timothy P. Callahan
*Assistant Examiner*—An T. Luu
*Attorney, Agent, or Firm*—Marger Johnson & McCollom, P.C.

[57] ABSTRACT

An internal power supply generating circuit for a semiconductor memory device reduces fluctuations in the external power supply by reducing the rate at which a drive transistor is turned on and off. The circuit includes a drive transistor that generates an internal power signal by reducing the external power supply voltage responsive to a bias signal. A feedback loop generates the bias signal and slows down the rate at which the bias signal changes, thereby reducing the rate at which the drive transistor turns on and off. The feedback loop includes a comparator for comparing the internal power supply voltage to a reference voltage and a bias circuit having a pair of push-pull transistors for generating the bias signal responsive to the output of the comparator. To slow down the rate at which the bias signal changes, the bias circuit includes a resistor coupled in series with the transistors and/or a capacitor couple to the output terminal of the bias circuit. Alternatively, the bias circuit includes a third transistor coupled in series with the push-pull transistors. A voltage divider is coupled to the gate of the third transistor and the gate of one of the push-pull transistors to turn the third transistor on. The feedback loop optionally includes a delay circuit to prevent malfunctions caused by the differences in voltage associated with sensing the internal power supply voltage at remote locations on a memory device.

4 Claims, 5 Drawing Sheets

INTERNAL POWER SUPPLY GENERATING CIRCUIT FOR A SEMICONDUCTOR MEMORY DEVICE

This application corresponds to Korean patent application No. 96-64014 filed Dec. 10, 1996 in the name of Samsung Electronics Co., Ltd., which is herein incorporated by reference for all purposes.

BACKGROUND OF THE INVENTION

1. Field of the Invention

This invention relates generally to semiconductor memory devices and more particularly to an internal power supply voltage generating circuit for a semiconductor memory device.

2. Description of the Related Art

Semiconductor memory devices typically use an internal power supply voltage which is lower than the external power supply voltage VCC since it presents the following advantages. First, as the gate oxide layer of transistors in dynamic random access memory (DRAM) devices becomes thinner, it is difficult to ensure the reliability of transistors using the 5 V standard power supplies that have been used since the 64K DRAM generation was developed. This problem is particularly serious in DRAM devices having a density of 16M or more. Therefore, the power supply voltage VCC for 16M DRAMs is typically lowered to 3.3 V, and must be decreased even more for devices having a density of 64M or more. However, from a user's standpoint, it is desirable to maintain the same VCC over two or three generations in order to reduce costs. To overcome this problem, an internal power supply voltage, which is suitable for operating transistors in a memory device, is generated by stepping down the external power supply voltage.

Second, different internal power supplies can be used inside one memory chip, thereby allowing the chip area to be minimized.

Third, the use of an internal power supply facilitates the operation of a memory device from a battery. Since the voltage of a battery decreases with the lapse of time, a large margin in the power supply voltage VCC is required for highly integrated memory devices. Thus, the use of an internal power supply voltage generator improves the reliability of a battery operated memory device.

Fourth, the use of an internal power supply can improve the performance of a memory device. For example, if the internal power supply voltage is less than the external power supply voltage VCC, a memory chip is not affected by fluctuations in the external power supply voltage. Also, when an internal power supply is used, the voltage of the internal power supply can be actively changed to compensate for changes in temperature and processing conditions. For example, the maximum operating speed of a chip generally decreases under low voltage and high temperature conditions. However, when the internal power supply voltage has a positive temperature coefficient, the operating speed of the chip is maintained even when the temperature increases. Also, even though variations in processing conditions cause variations in the channel length or the threshold voltage of each transistor, the operating speed can be maintained by setting the internal power supply voltage to accommodate changes in processing conditions.

Semiconductor memory devices that employ internal power supply voltage generating circuits typically include an array internal power supply voltage generating circuit for driving a memory cell array and a peripheral circuit internal power supply voltage generating circuit for driving a peripheral circuit.

A typical internal power supply voltage generating circuit compares a predetermined reference voltage with each output therefrom to constantly maintain the output voltage.

FIG. 1 shows a prior art internal power supply voltage generating circuit. Referring to FIG. 1, an output signal VIVG from the internal power supply voltage generating circuit is fed back to a comparator 110 and then compared with a reference voltage VREF.

If the internal power supply voltage VIVG is higher than the reference voltage VREF, the output from the comparator 110 is high. The output from the comparator 110 is transferred to a node N103 via an inverter 101 which generates a low voltage. Accordingly, a PMOS transistor 109 in a bias portion 107 is activated. Thus, an output node N105 of the bias portion 107 is high, and a driver 130 is deactivated, thereby maintaining the internal power supply voltage at a constant level.

If the internal power supply voltage VIVG becomes lower than the reference voltage, the output from the comparator 110 goes low. This causes the level of node N103 to go high, thereby activating an NMOS transistor 111 in the bias portion 107. Thus, the NMOS transistor 111 of the bias portion 107 and a PMOS transistor 113 in a precharge portion 120 are simultaneously activated. The output voltage from the bias portion 107 at node N105 is determined by the width and length of the gate in the NMOS transistor 111 of the bias portion 107 and the PMOS transistor 113 of the precharge portion 120. Thus, the driver 130 is activated by a predetermined voltage at the node N105, thereby raising the internal power supply voltage VIVG.

During a read or write operation of the semiconductor memory device, the internal power supply voltage VIVG is transferred to a bit line when a memory cell is selected. Also, when a sensing operation of the bit line is initiated, the internal power supply voltage VIVG is supplied to a "high" line of the paired bit lines. This causes the internal power supply voltage VIVG to fall below the reference voltage VREF. The decreased internal power supply voltage is then fed back to the comparator 110 of the internal power supply voltage generating circuit which compares it with the reference voltage VREF, thereby turning on the driver 130. Accordingly, the internal power supply voltage VIVG increases. Then, when the internal power supply voltage VIVG reaches the reference voltage VREF, the driver 130 is turned off.

However, in the prior art internal power supply voltage generating circuit, the external power supply voltage VCC and the ground voltage VSS fluctuate sharply due to the abrupt activation or deactivation of the driver 130. These fluctuations affect other properties of the chip, e.g., the input voltage level, thus causing malfunctions.

Accordingly, a need remains for an internal power supply voltage generating circuit which overcomes the problems of the prior art.

SUMMARY OF THE INVENTION

Therefore, it is an object of the present invention to improve the performance of an internal power supply voltage generating circuit for a semiconductor memory device.

Another object of the present invention is to reduce fluctuations in the external power supply for a semiconductor memory device having an internal power supply voltage generating circuit.

A further object of the present invention is reduce malfunctions caused by sensing the internal power supply voltage at remote locations in semiconductor memory devices having an internal power supply voltage generating circuits.

To accomplish these and other objects, an internal power supply generating circuit constructed in accordance with the present invention reduces fluctuations in an external power supply by reducing the rate at which a drive transistor is turned on and off. The circuit includes a drive transistor that generates an internal power signal by reducing the external power supply voltage responsive to a bias signal. A feedback loop generates the bias signal and slows down the rate at which the bias signal changes, thereby reducing the rate at which the drive transistor turns on and off.

The feedback loop includes a comparator for comparing the internal power supply voltage to a reference voltage and a bias circuit having a pair of push-pull transistors for generating the bias signal responsive to the output of the comparator. To slow down the rate at which the bias signal changes, the bias circuit includes a resistor coupled in series with the transistors and/or a capacitor coupled to the output terminal of the bias circuit. Alternatively, the bias circuit includes a third transistor coupled in series with the push-pull transistors. A voltage divider is coupled to the gate of the third transistor and the gate of one of the push-pull transistors to turn the third transistor on.

The feedback loop optionally includes a delay circuit to prevent malfunctions caused by the voltage differences associated with sensing the internal power supply voltage at remote locations on a memory device.

One aspect of the present invention is an internal power signal generating circuit for a semiconductor memory device comprising: a driver for reducing the voltage of an external power signal responsive to a bias signal, thereby generating an internal power signal, the driver having an input terminal for receiving the bias signal, a power terminal for receiving the external power signal, and an output terminal for transmitting the internal power signal; and a feedback loop coupled to the driver for generating the bias signal responsive to the internal power signal and a reference signal; wherein the feedback loop reduces the rate at which the bias signal changes, thereby reducing fluctuations in the external power signal.

The feedback loop preferably includes: a comparator having a first input terminal coupled to the output terminal of the driver to receive the internal power signal, a second input terminal coupled to receive a reference signal, and an output terminal for transmitting a comparison signal; and a bias circuit having an input terminal coupled to the output terminal of the comparator for receiving the comparison signal, and an output node coupled to the input terminal of the driver. The bias circuit preferably includes: a pair of transistors arranged in a push-pull configuration to generate the bias signal, each transistor having an input terminal coupled to receive the comparison signal and an output terminal coupled to the output node of the bias circuit; and a resistor coupled in series with the pair or transistors to reduce the rate at which the bias signal changes. Alternatively, the bias circuit can include a capacitor coupled to the output node of the bias circuit to reduce the rate at which the bias signal changes. The bias circuit can also include a delay circuit coupled between the output terminal of the comparator and the input terminals of the transistors.

Another aspect of the present invention is an internal power supply generating circuit for a semiconductor memory device comprising: a comparator for comparing an internal power supply voltage with a predetermined reference voltage; a bias portion coupled to the comparator for responding to an output signal from the comparator, wherein the bias portion slows the response to the output signal from the comparator; and a driver coupled to the bias portion for driving the internal power supply when the internal power supply voltage is lower than the reference voltage.

The bias portion comprises: a resistor having a first node connected to an external power supply; a pull-up transistor having a source connected to a second node of the resistor and a gate coupled to the comparator to turn the pull-up transistor on when the internal power supply voltage is higher than the reference voltage; and a pull-down transistor having a source connected to a power supply ground, a drain commonly connected to a drain of the pull-up transistor, and a gate coupled to the comparator to turn the pull-down transistor on when the internal power supply voltage is lower than the reference voltage.

An advantage of the present invention is that it reduces fluctuations in the external power supply for a semiconductor memory device having an internal power supply voltage generating circuit.

Another advantage of the present invention is that it reduces malfunctions caused by sensing the internal power supply voltage at remote locations in semiconductor memory devices having an internal power supply voltage generating circuits.

The foregoing and other objects, features and advantages of the invention will become more readily apparent from the following detailed description of a preferred embodiment of the invention which proceeds with reference to the accompanying drawings.

DETAILED DESCRIPTION

First Embodiment

Figure 1:
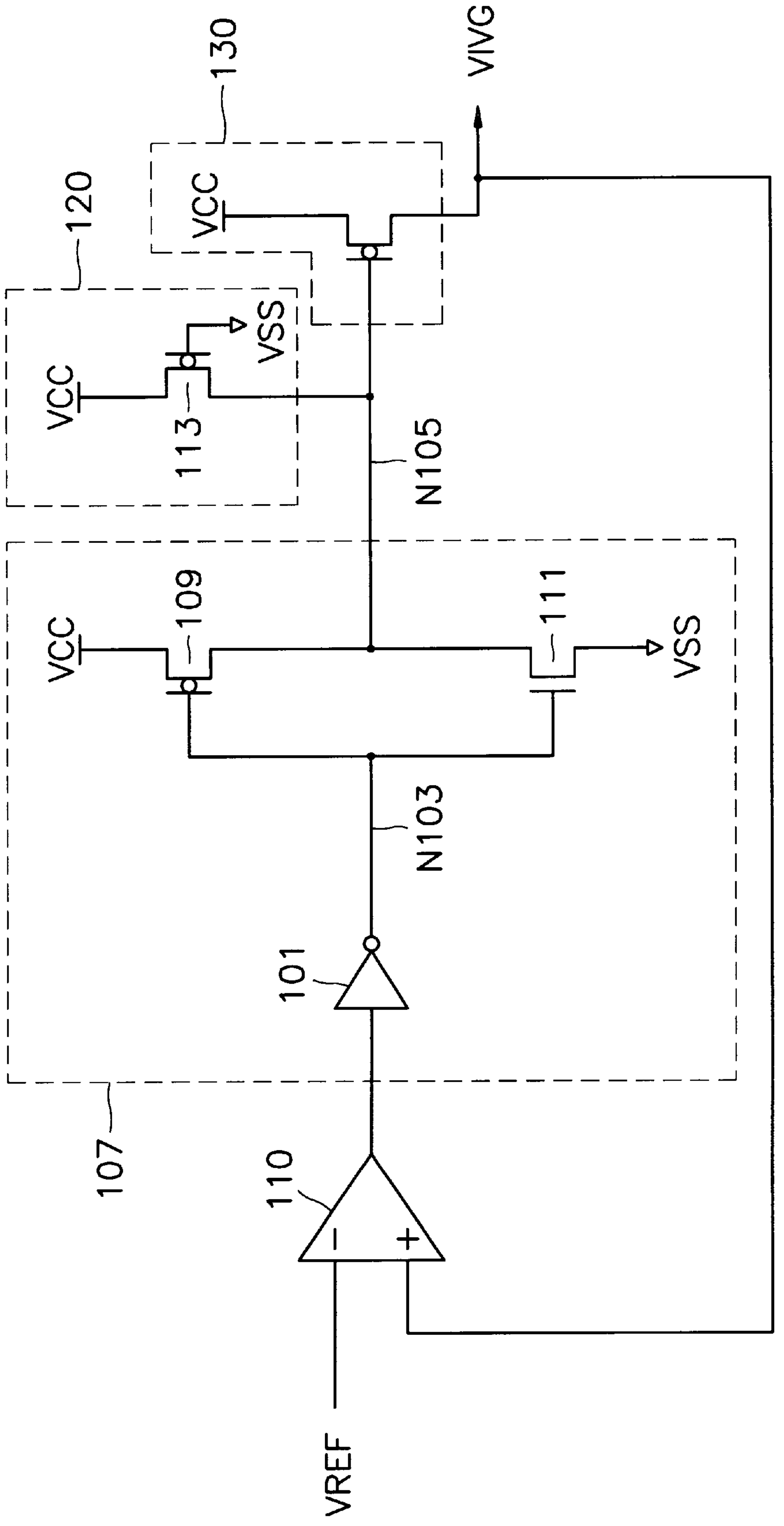
FIG. 1 (PRIOR ART)
FIG. 1 is a schematic diagram of a prior art internal power supply voltage generating circuit for a semiconductor memory device.
Figure 2:
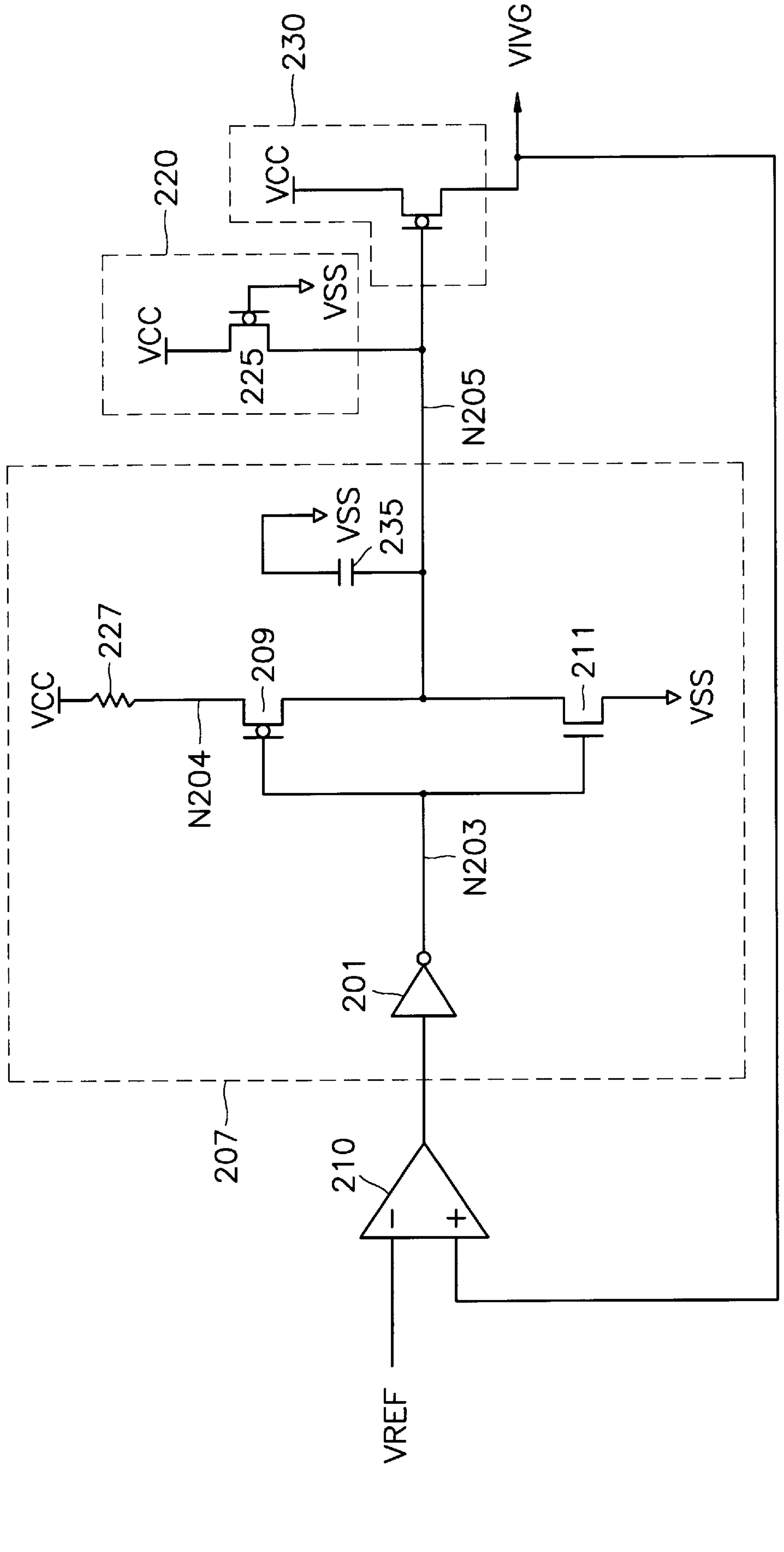
FIG. 2 is a schematic diagram of a first embodiment of an internal power supply voltage generating circuit constructed in accordance with the present invention.

Referring to FIG. 2, an internal power voltage generating circuit according to a first embodiment of the present invention includes a driver 230, a precharge portion 220, and a feedback loop which includes a comparator 210, and a bias portion 207.

The comparator 210 compares an output power supply signal VIVG from the internal power voltage generating circuit with a reference voltage VREF. Thus, the comparison signal, which is output from the comparator 210, is high when the output signal VIVG is higher than the reference voltage VREF, and the output signal therefrom is low when the output signal VIVG is lower than the reference voltage VREF.

The bias portion 207 responds to transitions of the logic state at the output node of the comparator to thereby maintain VIVG at a predetermined voltage. The precharge portion 220 precharges an output node N205 of the bias portion 207. The driver 230 raises the internal power voltage VIVG when the internal power voltage VIVG is lower than the reference voltage VREF.

The bias portion 207 includes an inverter 201, a resistor 227, a pull-up transistor 209 and a pull-down transistor 211. The inverter 201 inverts the output from the comparator 210. The first node of the resistor 227 is connected to an external power voltage VCC. The pull-up transistor 209 responds to a signal from an output node N203 of the inverter 201 and has its source connected to a second node N204 of the resistor 227. Thus, the pull-up transistor 209 is activated when the internal power voltage VIVG is higher than the reference voltage VREF.

The pull-down transistor 211 has a gate connected to the output terminal of the inverter 201, a source connected to ground VSS and a drain commonly connected to the drain of the pull-up transistor 209. The commonly connected drains form the output node N205 of the bias portion 207. Thus, the pull-down transistor 211 is activated when the internal power voltage VIVG is lower than the reference voltage VREF.

The precharge portion 220 comprises a PMOS transistor 225 for precharging the output node N205 of the bias portion 207 and has a source connected to the external power voltage VCC, a drain connected to the output node N205 of the bias portion 207 and a gate connected to ground VSS.

The driver 230 comprises a PMOS transistor for driving the internal power voltage VIVG and has a source connected to the external power voltage VCC, a drain connected to the internal power voltage VIVG, and a gate connected to the output node N205 of the bias portion 207.

The operation of the internal power voltage generating circuit of FIG. 2 will now be described in detail.

When the output signal VIVG from the internal power voltage generating circuit is higher than the reference voltage VREF, the output of the comparator 210 is high and the output of the inverter 201 is low. Also, the pull-up transistor 209 in the bias portion 207 is activated and the voltage at the output node N205 of the bias portion 207 is high. The driver 230 is deactivated so as to maintain the internal power voltage VIVG at a constant level. However, the resistor 227 reduces the rate at which the voltage at the output node N205 of the bias portion 207 increases. Accordingly, the deactivation rate of the driver 230 is decreased so that sharp fluctuations in the external power voltage as well as abrupt reductions in the internal power voltage VIVG are prevented.

On the other hand, when the output signal VIVG from the internal power voltage generator is lower than the reference voltage VREF, the output of the comparator 210 is low and the output of the inverter 201 is high. Also, the pull-down transistor 211 in the bias portion 207 is activated. Accordingly, the NMOS transistor 211 in the bias portion 207 and the PMOS transistor 225 in the precharge portion 220 are simultaneously activated. Thus, the voltage at the output node N205 of the bias portion 207 is determined according to the width-to-length ratios of the NMOS transistor 211 and the PMOS transistor 225. Thus, the driver 230 is activated in the linear region, thereby increasing the internal power voltage VIVG. However, in this embodiment, the resistor 227 decreases the rate at which the voltage at the output node N205 of the bias portion 207 changes. Accordingly, the activation rate of the driver 230 is reduced so as to prevent sharp changes in the external power voltage as well as abrupt increases in the internal power voltage.

The bias portion 207 may further include a capacitor 235 coupled between the output node N205 of the bias portion 207 and the external power voltage VCC or ground VSS. The capacitor 235 further slows down the rate at which the voltage at the output node N205 increases or decreases when the internal power voltage VIVG increases or decreases, thereby preventing abrupt changes in the internal power voltage VIVG.

When the capacitor 235 is included, the source of the pull-up transistor 209 may be directly connected to the power voltage VCC without resistor 227 therebetween.

Second Embodiment

Figure 3:
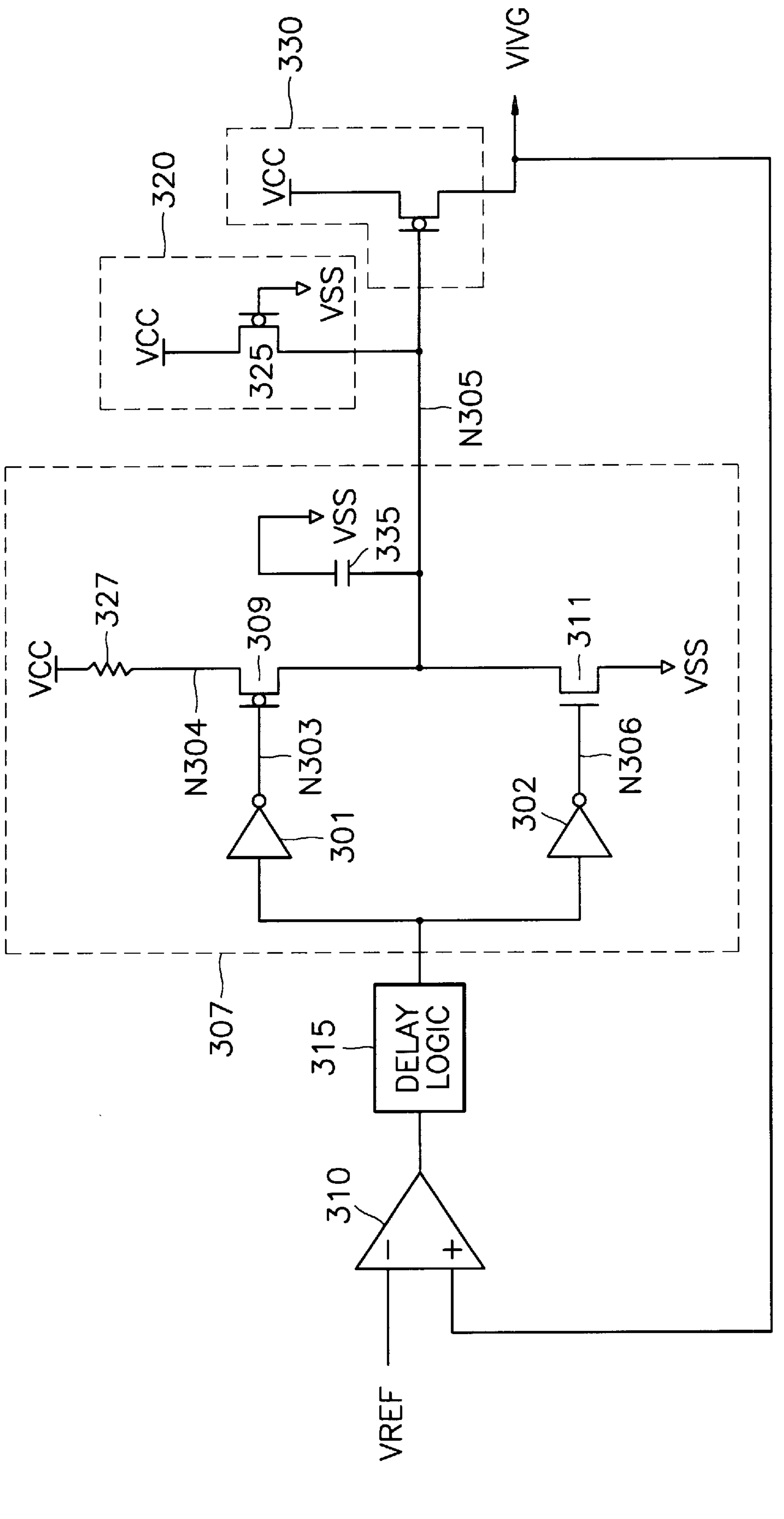
FIG. 3 is a schematic diagram of a second embodiment of an internal power supply voltage generating circuit constructed in accordance with the present invention.

FIG. 3 shows an internal power voltage generating circuit according to a second embodiment of the present invention. In FIG. 3, the internal power voltage generating circuit includes a driver 330, a precharge portion 320, and a feedback loop including a comparator 310, a delay logic circuit 315, and a bias portion 307.

The comparator 310 compares the output signal VIVG from the internal power voltage generating circuit, which is fed back to the positive input, with the reference voltage VREF.

The delay logic circuit 315 delays the output of the comparator 310. The delay logic circuit 315 prevents malfunctions which may be caused by the differences in voltages caused by the distance between the internal power voltage generating circuit and remote locations within a chip. That is, if the voltage at a point near the internal power voltage generating circuit is selected as the point for sensing VIVG, the voltage at this point is immediately fed back to the comparator 310, thereby interrupting the operation of the internal power voltage generating circuit before the level of the reference voltage VREF at a point far from the internal power voltage generating circuit level recovers. If this process is repeated, the internal power voltage at the point remote from the internal power voltage generating circuit continuously decreases, thus causing the chip to malfunction.

To solve this problem, the delay circuit 315 delays the interruption of the internal power voltage generating circuit so that the level of the internal power voltage at the point remote from the internal power voltage generating circuit recovers to the level of the reference voltage VREF.

The bias portion 307 responds to the transitions of the output signal from the delay logic 315, which are generated by the transitions of the logic state at the output node of the comparator 310 with a delay, to generate a predetermined voltage. The bias portion 307 includes a first inverter 301, a second inverter 302, a resistor 327, a pull-up transistor 309 and a pull-down transistor 311.

The first and second inverters 301 and 302 invert the output from the delay logic circuit 315. The resistor 327 has a first node connected to the external power voltage VCC. The pull-up transistor 309 has a gate connected to the output node N303 of the first inverter 301 and a source connected to a second node N304 of the resistor 327. Thus, the pull-up transistor 309 is activated when the internal power voltage VIVG is higher than the reference voltage VREF. The pull-down transistor 311 has a gate connected to the node N306 of the second inverter 302, a source connected to ground VSS and a drain commonly connected to the drain of the pull-up transistor 309. The commonly connected drains form an output node N305 of the bias portion 307. Thus, the pull-down transistor 311 is activated when the internal power voltage VIVG is lower than the reference voltage VREF.

In the bias portion 307, the first and second inverters 301 and 302 reduce power consumption by decreasing the duration during which the pull-up transistor 309 and the pull-down transistor 311 in the bias portion 307 are simultaneously active. For example, if the width-to-length ratio of the pull-up transistor in the first inverter 301 is much larger than that in the pull-down transistor, and the width-to-length ratio of the pull-up transistor in the second inverter 302 is very smaller than that of the pull-down transistor in the second inverter 302, the duration during which the pull-up transistor 309 and the pull-down transistor 311 are simultaneously active is reduced.

The precharge portion 320 includes a PMOS transistor having a source connected to the external power voltage VCC, a drain connected to the output node N305 of the bias portion 307 and a gate connected to ground VSS for precharging the output node N305 of the bias portion 307.

The driver 330 drives the internal power voltage VIVG in response to the voltage at the output node N305 of the bias portion 307. The driver 330 includes a PMOS transistor having a source connected to the external power voltage VCC, a drain connected to the internal power voltage VIVG and a gate connected to the output node N305 of the bias portion 307.

When the output signal VIVG from the internal power voltage generating circuit is higher than the reference voltage VREF, the output of the comparator 310 is high and the output voltage of the first inverter 301 is low. Also, the pull-up transistor 309 of the bias portion 307 is activated and the voltage at the output node N305 of the bias portion 307 is high. The driver 330 is deactivated to maintain the level of the internal power voltage VIVG at a constant level. However, resistor 327 reduces the rate at which the voltage at the output node N305 of the bias portion 307 changes. Accordingly, the deactivation rate of the driver 330 decreases so as to prevent sharp changes in the external power voltage as well as abrupt decreases in the internal power voltage VIVG.

On the other hand, when the output signal VIVG from the internal power voltage generating circuit is lower than the reference voltage VREF, the output of the comparator 310 is low and the output of the second inverter 302 is high. Also, the pull-down transistor 311 in the bias portion 307 is activated. Accordingly, the NMOS transistor 311 in the bias portion 307 and the PMOS transistor 325 of the precharge portion 320 are simultaneously activated. Thus, the voltage at the output node N305 of the bias portion 307 is determined according to the width-to-length ratios in the NMOS transistor 311 of the bias portion 307 and the PMOS transistor 325 of the precharge portion 320. Thus, the driver 330 is activated in the linear region, increasing the internal power voltage VIVG. However, resistor 327 reduces the rate at the voltage at output node N305 of the bias portion 307 changes. Accordingly, the activation rate of the driver 330 is reduced so as to prevent sharp changes in the external power voltage as well as abrupt increases in the internal power voltage.

The bias portion 307 can further include a capacitor 335 coupled between the output node N305 of the bias portion 307 and the external power voltage VCC or ground VSS. The capacitor 335 further slows down the rate at which the voltage at the output node N305 of the bias portion 307 increases or decreases when the internal power voltage VIVG increases or decreases, thereby preventing abrupt changes in the internal power voltage VIVG.

When the capacitor 335 is included, the source of the pull-up transistor 309 can be directly connected to the power voltage VCC without the resistor 327 therebetween.

Third Embodiment

Figure 4:
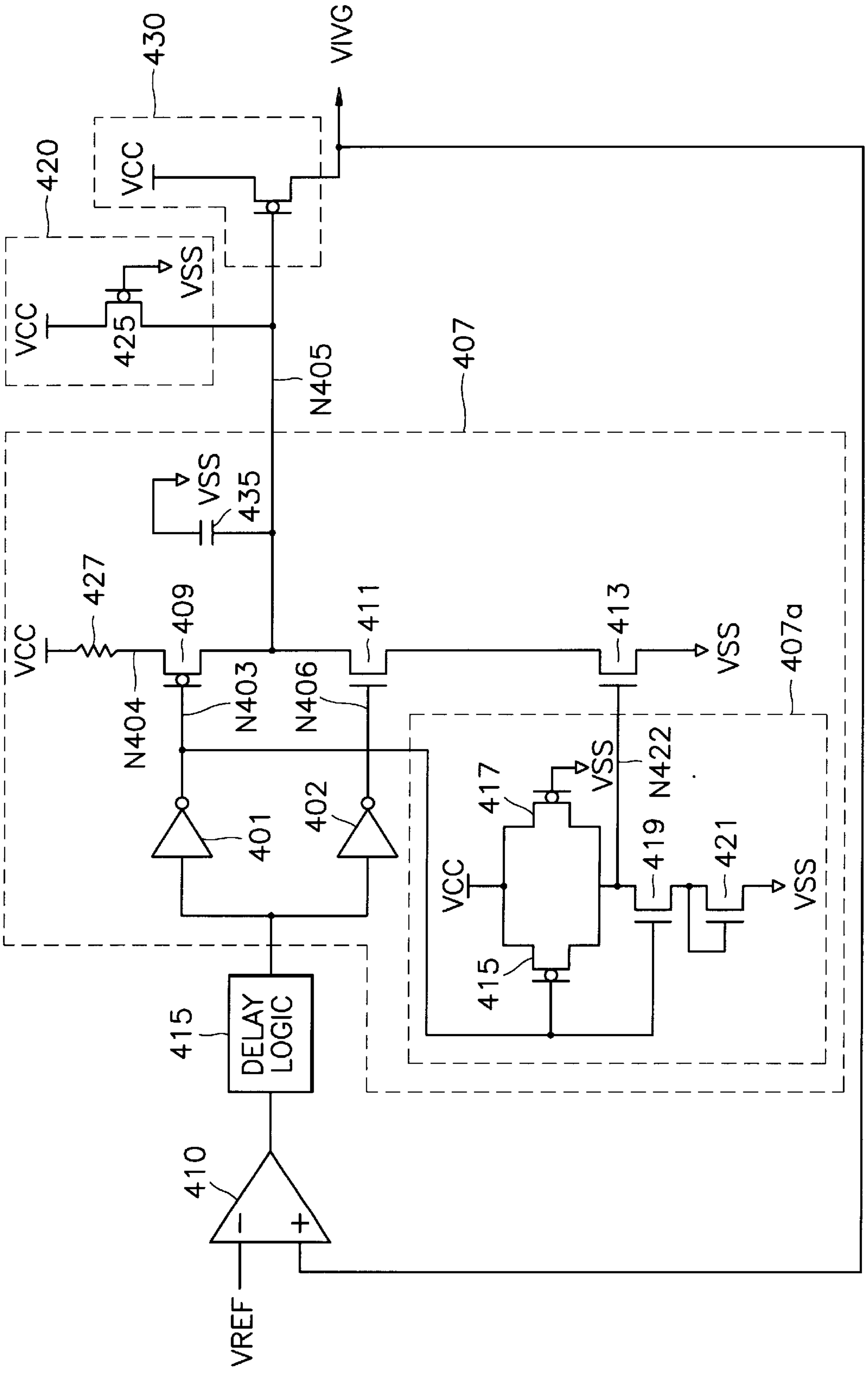
FIG. 4 is a schematic diagram of a third embodiment of an internal power supply voltage generating circuit constructed in accordance with the present invention.

FIG. 4 shows an internal power voltage generating circuit according to a third embodiment of the present invention. In FIG. 4, the internal power voltage generating circuit includes a driver 430, a precharge portion 420, and feedback loop including a comparator 410, a delay logic circuit 415, and a bias portion 407 like the internal power voltage generating circuit of the second embodiment shown in FIG. 3. However, the bias portion 407 is different from the bias portion 307 shown in FIG. 3 in that it also includes a voltage divider 407*a* and a transistor 413 which further reduce the abruptness with which the driver 430 switches, thereby improving the operation of the internal power generating circuit.

The comparator 410 compares the output signal VOVG from the internal power voltage generating circuit, which is fed back to the positive input, with the reference voltage VREF. The delay logic circuit 415 delays the output signal from the comparator 410. The delay logic circuit 415 prevents malfunctions which can be caused by the difference in voltages between points close to and far from the internal power voltage generating circuit within a memory chip.

The bias portion 407 generates a predetermined voltage in response to the output signal from the delay logic circuit 415. The logic state of the output signal from the delay logic circuit 415 is the same as that from the comparator 410. The bias portion 407 includes a first inverter 401, a second inverter 402, a resistor 427, a pull-up transistor 409, a first pulldown transistor 411, a second pull-down transistor 413 and a voltage divider 407*a*. The resistor 427 has a first node connected to the external power voltage VCC. The first and second inverters 401 and 402 invert the output from the delay logic circuit 415. The gate of the pull-up transistor 409 is connected to the output node N403 of the first inverter 401, and the source is connected to node N404 of the resister 427. Thus, the pull-up transistor 409 is activated when the internal power voltage VIVG is higher than the reference voltage VREF.

The gate of the pull-down transistor 411 is connected to node N406 of the second inverter 402, the source is connected to the drain of the second pull-down transistor 413, and the drain is commonly connected to the drain of the pull-up transistor 409. The commonly connected drains form an output node N405 of the bias portion 407. Thus, the first pull-down transistor 411 is activated when the internal power voltage VWG is less than the reference voltage VREF. The voltage divider 407*a* generates a predetermined voltage in response to the voltage at the output node N403 of the first inverter 401. The second pull-down transistor 413 has a gate connected to the output node N422 of the voltage divider 407*a*, a source connected to ground VSS, and a drain commonly connected to the source of the first pull-down transistor 411.

The voltage divider 407*a* includes a first PMOS transistor 415, a second PMOS transistor 417, a first NMOS transistor 419 and a second NMOS transistor 421. The first PMOS transistor 415 has a source connected to the power voltage VCC and a gate connected to the output node N403 of the first inverter 401. The second PMOS transistor 417 has a source connected to the power voltage VCC, a gate connected to ground VSS and a drain commonly connected to the drain of the first PMOS transistor 415. The first NMOS transistor 419 has a gate connected to the output node N403 of the first inverter 401 and a drain commonly connected to the drains of the first and second PMOS transistors 415 and 417. The commonly connected drains form the output node N422 of the voltage divider 407*a*. The second NMOS transistor 421 has a source connected to ground VSS and a gate and drain commonly connected to the source of the first NMOS transistor 419.

In the voltage divider 407*a*, the first PMOS transistor 415 is deactivated and the first NMOS transistor 419 is activated when the voltage at the output node N403 of the first inverter 401 is high. Thus, the voltage at the output node N422 of the voltage divider 407*a* is determined according to width-to-length ratios of the second PMOS transistor 417 and the second NMOS transistor 421.

When the voltage at the output node N403 of the first inverter 401 is low, the first PMOS transistor 415 of the voltage divider 407*a* is activated and the first NMOS transistor 419 is deactivated. Thus, the voltage at the output node N422 of the voltage divider 407*a* is high.

The resistor 427 connects the power node N404 of the bias portion 407 to the external power voltage VCC.

A capacitor 435 can optionally be connected between the output node N405 of the bias portion 407 and ground VSS. The capacitor 435 is fabricated from an NMOS transistor having a source and drain commonly connected to ground VSS, and a gate connected to the output node N405 of the bias portion 407. Alternatively, the capacitor 435 can be fabricated from a PMOS transistor having a source and drain commonly connected to the external power voltage VCC, and a gate connected to the output node N405 of the bias portion 407.

The precharge portion 420 precharges the voltage of the output node N405 of the bias portion 407. The precharge portion 420 includes a PMOS transistor having a source connected to the external power voltage VCC, a drain connected to the output node N405 of the bias portion 407, and a gate connected to ground VSS.

The driver 430 drives the internal power voltage VIVG in response to the voltage at the output node N405 of the bias portion 407. The driver 430 is comprised of a PMOS transistor having a source connected to the external power voltage VCC, a drain connected to the internal power voltage VIVG, and a gate connected to the output node N405 of the bias portion 407.

When the output signal VIVG of the internal power voltage generating circuit is higher than the reference voltage VREF, the output of the comparator 410 is high and the output voltage of the first inverter 401 is low. Thus, the pull-up transistor 409 of the bias portion 407 is activated. Also, the voltage at the output node N406 of the second inverter 402 is low to deactivate the first NMOS transistor 411. Thus, the output voltage of the bias portion 407 is high and the driver 430 is deactivated to maintain the level of the internal power voltage VIVG at a constant level. However, the resistor 427 and the capacitor 435 decrease the rate at which the voltage at the output node N405 of the bias portion 407 changes. Accordingly, the deactivation rate of the driver 430 decreases so that sharp fluctuations in the external power voltage as well as abrupt increases in the internal power voltage are prevented.

On the other hand, when the output signal VIVG of the internal power voltage generating circuit is lower than the reference voltage VREF, the output voltage of the comparator 410 is low and the output of the first inverter 401 is high. Thus, the pull-up transistor 409 of the bias portion 407 is deactivated. Also, the output voltage at the output node N406 of the second inverter 402 is high and activates the first NMOS transistor 411.

When the output voltage of the first inverter 401 is high at the output node N403, the output voltage of the voltage divider 407*a* is maintained at a predetermined level to activate the second NMOS transistor 413.

Accordingly, the first and second NMOS transistors 411 and 413 of the bias portion 407 and the PMOS transistor 425 of the precharge portion 420 are simultaneously activated. Thus, the voltage at the output node N405 of the bias portion 407 is determined according the width-to-length ratios of the first and second NMOS transistors 411 and 413 of the bias portion 407 and the PMOS transistor 425 of the precharge portion 420. Thus, the driver 430 is activated by a predetermined voltage at node N405, thereby increasing the internal power voltage VIVG. However, the resistor 427 and the capacitor 435 reduce the rate at which the voltage at the output node N405 of the bias portion 407 changes. Accordingly, the activation rate of the driver 430 slows down, so that sharp fluctuations in the external power voltage as well as abrupt increases in the internal power voltage are prevented.

Fourth Embodiment

Figure 5:
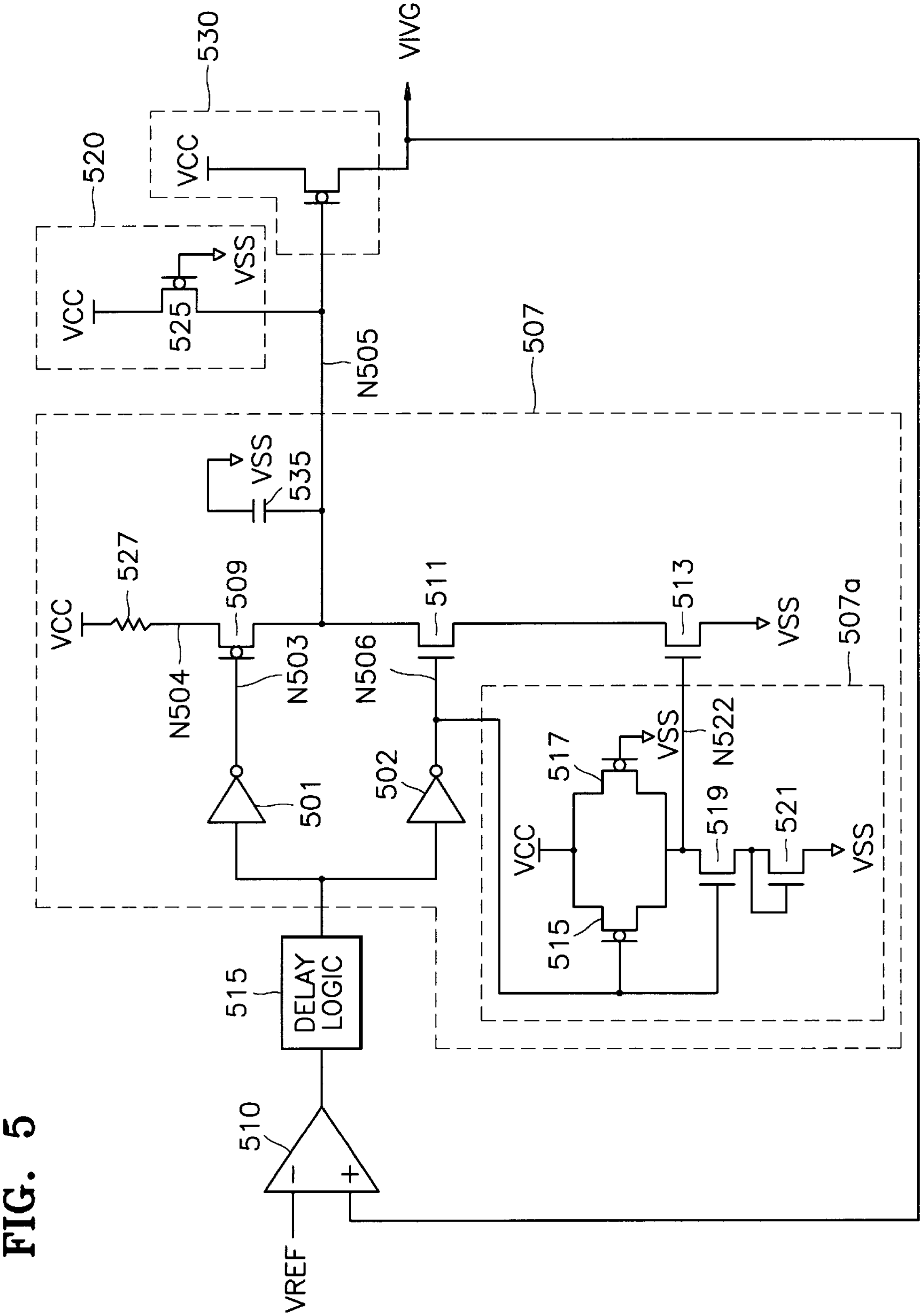
FIG. 5 is a schematic diagram of a fourth embodiment of an internal power supply voltage generating circuit constructed in accordance with the present invention.

FIG. 5 shows an internal power voltage generating circuit according to a fourth embodiment of the present invention. In FIG. 5, the internal power voltage generating circuit includes a driver 530, a precharge portion 520, and a feedback loop including a comparator 510, a delay logic circuit 515, a bias portion 507, a resistor 527, and a capacitor 535 like the internal power voltage generating circuit of the third embodiment shown in FIG. 4. As with the circuit of FIG. 4, the circuit of FIG. 5 includes additional components which further reduce the abruptness with which the driver 530 switches. However, the bias portion 507 of FIG. 5 is different from the bias portion 407 of FIG. 4.

The voltage divider 507*a* of the bias portion 507 generates a predetermined voltage in response to the voltage at the output node N506 of the second inverter 502, rather than the voltage at the output node N503 of the first inverter 501. The structure, operation and effect of each element are the same as those of the third embodiment illustrated with reference to FIG. 4. Accordingly, sharp changes in the external power voltage as well as abrupt increases in the internal power voltage are prevented by the embodiment of the present invention shown in FIG. 5.

Thus, in an internal power voltage generating circuit constructed in accordance with the present invention, the drive transistor is activated and deactivated smoothly so as to reduce noise in the external power voltage VCC and ground VSS, thereby providing a stable internal power voltage to prevent malfunction of other circuits within the chip.

Having described and illustrated the principles of the invention in a preferred embodiment thereof, it should be apparent that the invention can be modified in arrangement and detail without departing from such principles. We claim all modifications and variations coming within the spirit and scope of the following claims.

We claim:

1. An internal power signal generating circuit for a semiconductor memory device comprising:

a driver for reducing the voltage of an external power signal responsive to a bias signal, thereby generating an internal power signal, the driver having an input terminal for receiving the bias signal, a power terminal for receiving the external power signal, and an output terminal for transmitting the internal power signal; and a feedback loop coupled to the driver for generating the bias signal responsive to the internal power signal and a reference signal;

wherein the feedback loop reduces the rate at which the bias signal changes;

wherein the feedback loop includes:

a comparator having a first input terminal coupled to the output terminal of the driver to receive the internal power signal, a second input terminal coupled to receive a reference signal, and an output terminal for transmitting a comparison signal; and a bias circuit having an input terminal coupled to the output terminal of the comparator for receiving the comparison signal, and an output node coupled to the input terminal of the driver; and wherein the bias circuit includes:

a pair of transistors arranged in a push-pull configuration to generate the bias signal, each transistor having an input terminal coupled to receive the comparison signal and an output terminal coupled to the output node of the bias circuit;

a third transistor coupled in series with the pair of transistors; and a voltage divider having an input terminal coupled to the input terminal of one of the pair of transistors and an output terminal coupled to an input terminal of the third transistor.

2. An internal power supply generating circuit for a semiconductor memory device comprising:

a comparator for comparing an internal power supply voltage with a predetermined reference voltage;

a delay logic circuit coupled to the comparator for delaying an output signal from the comparator;

a bias portion coupled to the delay logic circuit for responding to an output signal from the delay logic circuit; and a driver coupled to the bias portion for driving the internal power supply when the internal power supply voltage is lower than the reference voltage;

wherein the bias portion comprises:

first inverting means for inverting the output signal from the delay logic circuit;

second inverting means for inverting the output signal from the delay logic circuit;

a resistor having a first node connected to an external power supply;

a pull-up transistor having a source connected to a second node of the resistor and a gate coupled to the comparator to turn the pull-up transistor on when the internal power supply voltage is higher than the reference voltage;

a first pull-down transistor having a source connected to a power supply ground, and a gate coupled to the comparator to turn the pull-down transistor on when the internal power supply voltage is lower than the reference voltage;

a voltage divider for generating a predetermined voltage in response to the output signal of the first inverting means or the output signal of the second inverting means; and a second pull-down transistor having a gate connected to an output terminal of the voltage divider, a source connected to ground and a drain connected to a source of the first pull-down transistor.

3. The internal power supply generating circuit of claim 2, wherein the voltage divider comprises:

a PMOS transistor having a source connected to the external power supply and a gate connected to ground;

a first NMOS transistor having a gate connected to an input of the voltage divider and a drain commonly connected to the drain of the PMOS transistor; and a second NMOS transistor having a source connected to ground and a gate and drain commonly connected to the source of the first NMOS transistor.

4. The internal power supply generating circuit of claim 2, wherein the bias portion further comprises:

a capacitor connected between an output node of the bias portion and a power supply terminal.

* * * * *